United States Patent
Naik et al.

(10) Patent No.: US 7,625,021 B2
(45) Date of Patent: Dec. 1, 2009

(54) RESIN BUMPER COVER ATTACHMENT

(75) Inventors: Umesh Naik, Ann Arbor, MI (US);
Brian Lindsay, Ann Arbor, MI (US);
Eric Yoshinari, San Diego, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 302 days.

(21) Appl. No.: 11/463,761

(22) Filed: Aug. 10, 2006

(65) Prior Publication Data
US 2008/0036223 A1    Feb. 14, 2008

(51) Int. Cl.
*B60R 19/03* (2006.01)
(52) U.S. Cl. .................... 293/120; 293/154
(58) Field of Classification Search .............. 293/120, 293/122, 154, 155; 296/39.1, 181.2, 901.01
See application file for complete search history.

(56) References Cited

U.S. PATENT DOCUMENTS

| | | | |
|---|---|---|---|
| 2,191,689 A | 2/1940 | Tinnerman | |
| 3,827,741 A | 8/1974 | Howell et al. | |
| 3,851,910 A * | 12/1974 | Levenberg | 293/135 |
| 4,095,831 A * | 6/1978 | Hagiwara et al. | 293/126 |
| 4,193,621 A * | 3/1980 | Peichl et al. | 293/142 |
| 4,460,206 A * | 7/1984 | Peter | 293/132 |
| 4,563,028 A * | 1/1986 | Ogawa et al. | 293/122 |
| 4,623,182 A * | 11/1986 | Trabert et al. | 293/155 |
| 4,838,593 A * | 6/1989 | Fleming et al. | 293/126 |
| 4,961,603 A * | 10/1990 | Carpenter | 293/102 |
| 5,108,138 A | 4/1992 | Kawaguchi et al. | |
| 5,188,408 A | 2/1993 | Berdan et al. | |
| 5,195,793 A | 3/1993 | Maki et al. | |
| 5,202,172 A * | 4/1993 | Graf | 428/100 |
| 5,290,078 A | 3/1994 | Bayer et al. | |
| 5,338,077 A * | 8/1994 | Haberle et al. | 293/120 |
| 6,135,517 A | 10/2000 | Cordebar et al. | |
| 6,322,115 B1 | 11/2001 | Devilliers et al. | |
| 6,364,384 B1 * | 4/2002 | Kemp et al. | 293/120 |
| 6,886,872 B2 * | 5/2005 | Matsumoto et al. | 293/115 |
| 7,207,617 B2 * | 4/2007 | Pelini | 296/29 |
| 7,303,219 B2 * | 12/2007 | Trabant et al. | 293/155 |
| 2003/0015882 A1 | 1/2003 | Nagae et al. | |

* cited by examiner

*Primary Examiner*—Dennis H Pedder
*Assistant Examiner*—Pinel E Romain
(74) *Attorney, Agent, or Firm*—Gifford, Krass, Sprinkle, Anderson & Citkowski, P.C.

(57) ABSTRACT

A bumper cover assembly includes a resin panel, a fastener and a retainer. The panel has an inner surface. The fastener extends outwardly from a vehicle body. The retainer is fixedly secured to the inner surface of the resin panel. The retainer includes a hole for receiving the fastener therethrough, so as to fixedly secure the resin panel to the body of the vehicle.

17 Claims, 2 Drawing Sheets

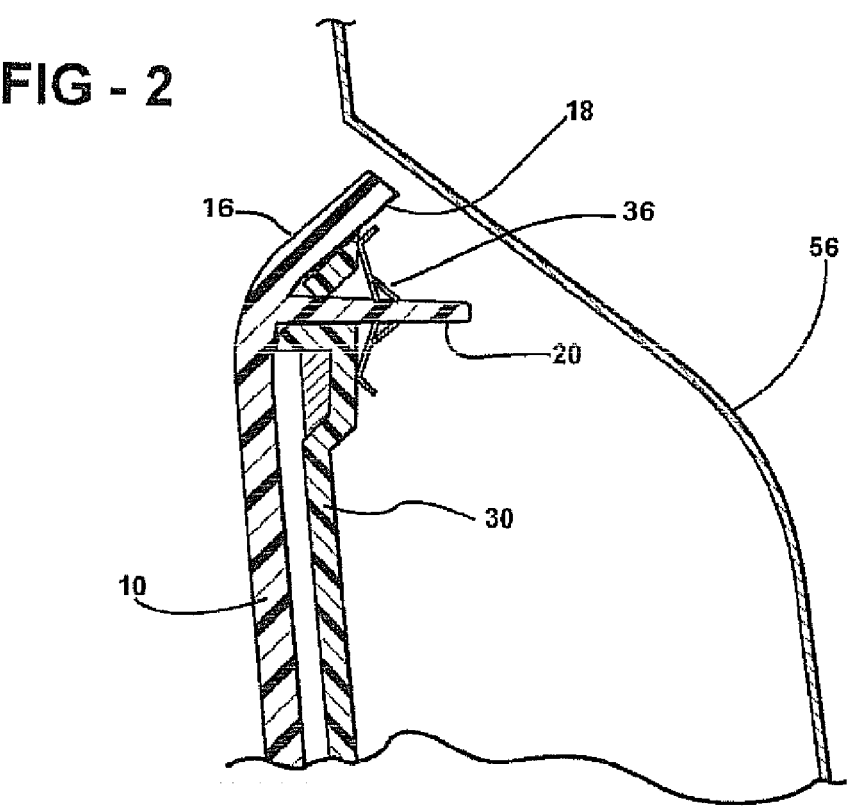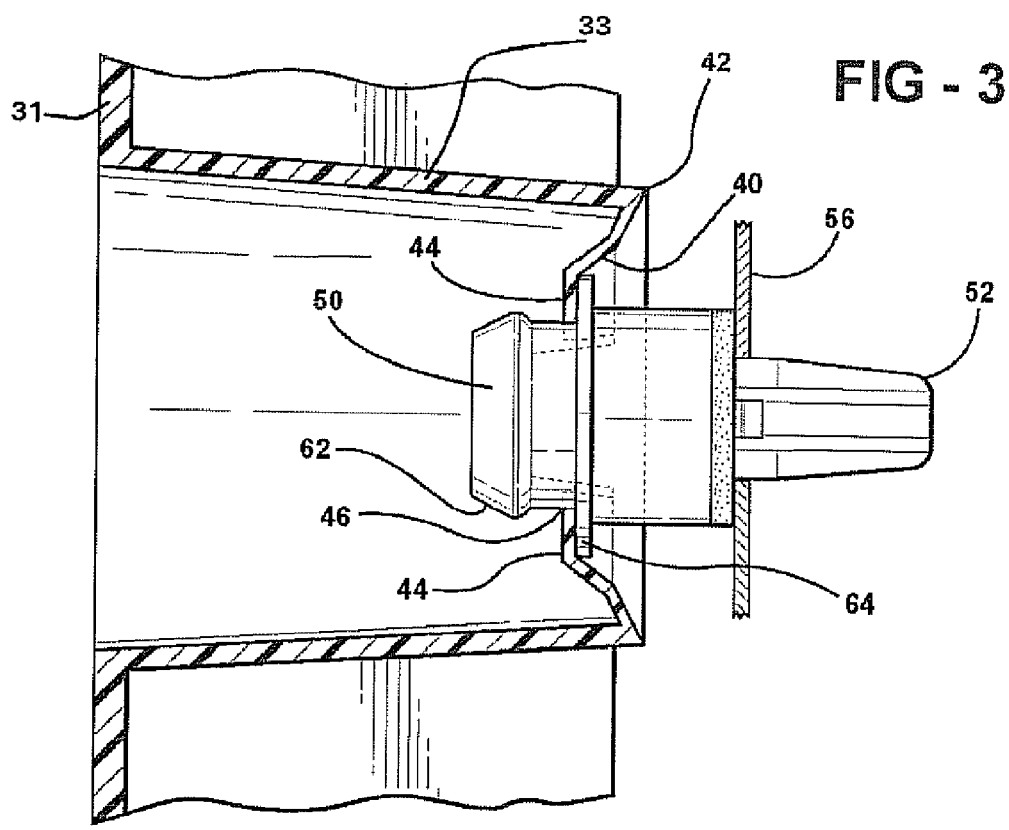

RESIN BUMPER COVER ATTACHMENT

BACKGROUND OF THE INVENTION

1. Field of the Invention

The invention relates to a bumper assembly for an automotive vehicle and, more particularly, to a retainer and fastener for attaching a resin panel or bumper to the body of the vehicle.

2. Description of the Related Art

Modern automotive vehicles utilize resin bumper covers and panels. Bumper covers serve a dual function of defining an outer appearance of the vehicle and absorbing bumps and impacts experienced at the front and rear ends of the vehicle. It is known to provide integrally formed ribs to strengthen a resin bumper or panel to better withstand the bumps and impacts. Integrally formed ribs, however, present the potential for unsightly sink marks or lines to be formed along the outer surface of the bumper. The sink marks or lines usually result from uneven cooling between the main substrate or wall of the bumper and the ribs. Guidelines for designing ribs that do not result in sink lines are well known in the art. These guidelines in general limit the radius defined between the ribs and the inner surface of the bumper wall and also the size, i.e. width and depth, of the ribs based on the thickness of the main wall of the bumper. Similar guidelines are applied to the design of integrally formed fasteners or bosses for holding fasteners on a resin panel.

Thus, it remains desirable to provide a way of reinforcing a resin panel or bumper, while minimizing or eliminating the possibility of forming undesirable sink lines alone the outer surface of the panel or bumper.

SUMMARY OF THE INVENTION

According to one aspect of the invention, a bumper cover assembly is provided for attaching a panel to a body of an automotive vehicle. The bumper cover assembly structure includes a resin panel, a fastener and a retainer. The panel has an inner surface. The fastener extends outwardly from a vehicle body. The retainer is fixedly secured to the inner surface of the resin panel. The retainer includes a hole for receiving the fastener therethrough, so as to fixedly secure the resin panel to the body of the vehicle.

According to another aspect of the invention, a vehicle includes a body, a fastener, a panel and a retainer. The fastener extends outwardly from the body. The panel has an inner surface. The panel is formed of resin material. The retainer is fixedly secured along the inner surface of the panel. The retainer is formed of resin material and has a plurality of integrally formed ribs for reinforcing the panel. The retainer and fastener are adapted to be fixedly secured to each other so as to fixedly secure the panel to the body.

BRIEF DESCRIPTION OF THE DRAWINGS

Advantages of the present invention will be readily appreciated as the same becomes better understood by reference to the following detailed description when considered in connection with the accompanying drawing, wherein:

FIG. 2 is a cross-sectional view of the bumper assembly showing the attachment of a retainer to an inner surface of a resin bumper; and FIG. 3 is a cross-sectional view of the bumper assembly showing attachment of the retainer to the vehicle body.

DETAILED DESCRIPTION OF THE INVENTION

Figure 1:
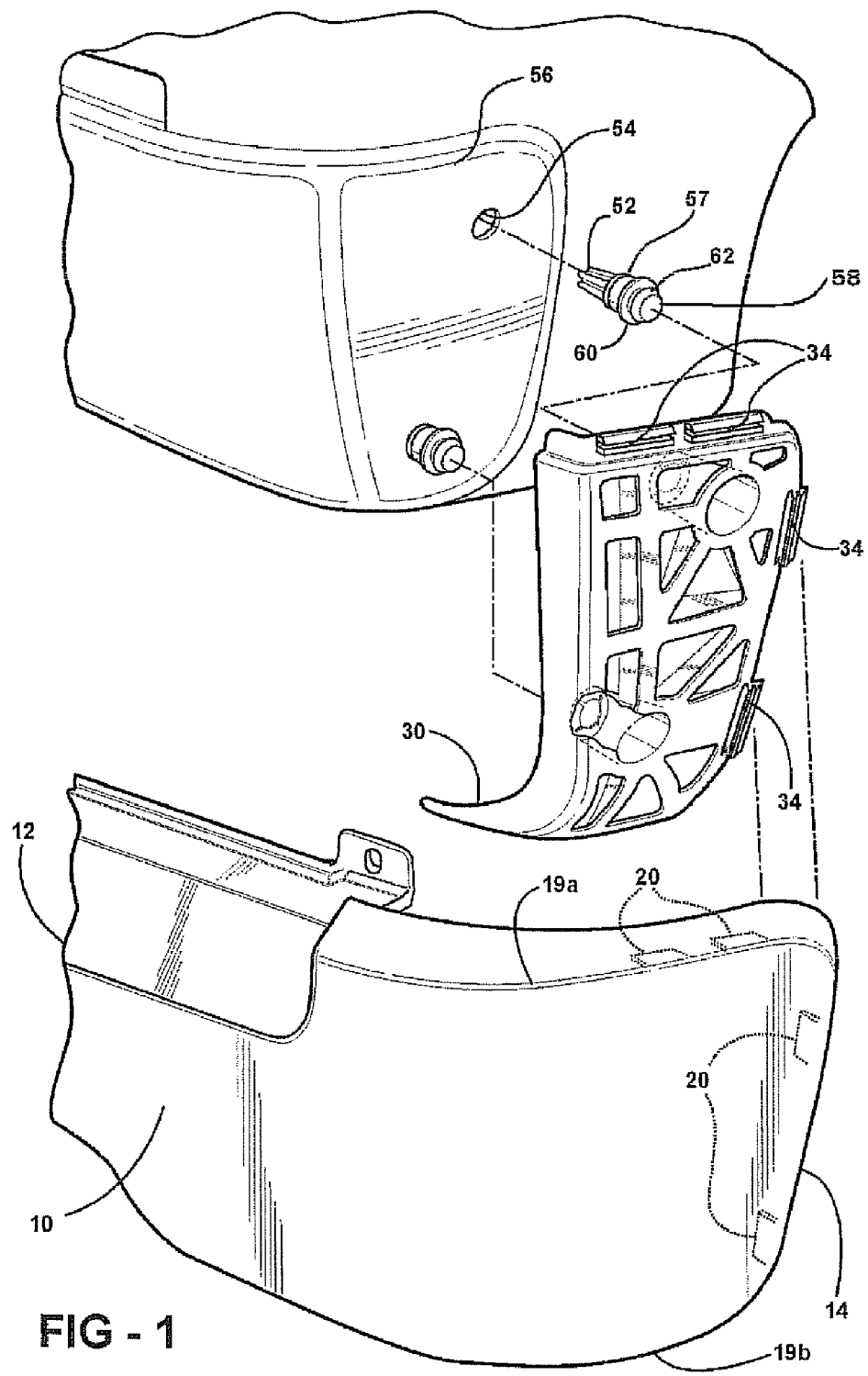
FIG. 1 is an exploded perspective view of a bumper assembly for a truck according to one embodiment of the invention.

The invention provides an improved structural arrangement for attaching a resin panel or bumper cover to a vehicle body. The arrangement includes a retainer that is fixedly secured to an inner surface of the bumper The retainer itself is fixedly secured to the bumper to the vehicle, thereby securing the bumper to the vehicle. The invention improves over conventional designs by providing reinforcing or stiffening ribs in the retainer rather than the bumper, thereby avoiding the potential of sink lines being formed along the visible outer surface of the bumper. The inventive structural arrangement is discussed in detail below.

Referring to the figures, the resin bumper is generally indicated at 10. The bumper 10 includes a rear wall 12 and a side wall 14, each having an outer surface 16 and an opposite inner bumper surface 18. The bumper further includes a pair of opposing longitudinal edges 19a, 19b. The inner and outer surface 16, 18 extend transversely between the opposing longitudinal edges 19a, 19b. A flange 20 extends from the inner surface 18 of the side wall 14.

FIG. 1 clearly shows that the bumper has a pair of opposing longitudinal edges. No new matter was added.

A resin retainer 30 is fixedly secured to the inner surface IS of the side wall 14. The retainer 30 has a shape corresponding to the shape of the side wall 14. The retainer 30 includes a plurality of cutouts and ribs 32 formed along the edges defining the cutouts. The ribs 32 reinforce the retainer 30 and the side wall 14. The retainer 30 includes a hole or slot 34 for receiving the flange 20 therethrough. A barbed metal clip 36 is fixedly secured to the flange 20, so that the retainer 30 is retained between the inner surface 18 and the metal clip 36. Other conventional fasteners or clips may be used to retain the flange 20 in the slot 34.

The retainer 30 also includes a main wall 31, having an outer surface extending between opposite distal ends of the main wall. A cylindrical boss 33 extends outwardly from the main wall 31 toward the vehicle body. A distal end of the boss 33 includes a circular shaped edge 42. A plurality of petal-shaped fingers 40 extend inwardly from the circular shaped edge 42. The distal ends 44 of the fingers 40 are arcuate and together define a circular opening 46. The fingers 40 are generally rigid, but will bend or flex in an axial direction relative to the opening 46 for receiving an end of a fastener 50 therethrough. The length of the boss 33 depends on the packaging constraints established during the design of the vehicle. It should, therefore, be readily appreciated that the circular shaped edge may be formed in a main wall of the retainer rather than the end of the boss.

Support for the "outer surface extending between opposite distal ends of the main wall" may be found in the drawings. Specifically FIG. 1 shows the retainer having an outer surface that extends between opposite distal ends. No new matter was added.

The fastener 50 is generally cylindrical and includes a tapered inner end 52 that is adapted to extend through a hole 54 formed in a sheet metal panel 56 of the vehicle body. A middle portion 57 of the fastener 50 is adapted to retain the edges defining the hole 54, so that the fastener 50 is secured to the panel 56. An opposite outer end 58 of the fastener 50 is adapted to extend through the circular opening 46 in the retainer 30. The outer end 58 includes a pair of retaining flanges 60, 62. The flanges 60, 62 are annular shaped and oversized relative to the diameter of the circular opening 46 and are spaced apart to retain the ends 44 of the fingers 40 therebetween.

Prior to assembly of the bumper 10 to the vehicle, the fasteners 50 are inserted through the holes 54 and fixedly secured to the sheet metal panel 56 of the vehicle body. The retainer 30 is fixedly secured along the inner surface 18 the side wall 14 of the bumper 10 by the metal clips 36. The bumper 10 is installed onto the vehicle by aligning the circular openings 46 with the fasteners 50. Pressure is applied along the outer surface of the side wall 14 so that the outermost flange 60 is pressed through the circular opening 46. The fingers 40 flex to allow the outermost flange 60 to pass therethrough. The fingers 40 return elastically to their original position. The fingers 40 are retained between the flanges 60, 62, thereby securing the bumper 10 to the vehicle.

The invention improves over conventional designs by providing rigidity to the bumper walls and eliminating the need to have integrally formed ribs along the inner surface. Designing a bumper with integrally formed ribs along the inner surface of the bumper walls presents a risk of visible sink lines being formed along the outer surface of the bumper 10. The sink lines are typically due to uneven cooling of the plastic resin near the base of the ribs. Providing the retainer 30 with reinforcing ribs and fixedly securing the retainer 30 to the side wall 14 eliminates the risk of sink lines and at the same time provides an efficient means of securing the bumper 10 to the vehicle body.

The invention has been described in an illustrative manner. It is therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

The invention claimed is:

1. A bumper cover assembly mounted to a vehicle body comprising:
   a bumper having an outer surface and an inner bumper surface extending transversely between a pair of opposing longitudinal edges, and a flange extending outwardly from The inner bumper surface;
   a fastener extending outwardly from the vehicle body;
   a retainer having an outer surface, the outer surface having a shape complimentary to the inner bumper surface of the bumper, the retainer further including a portion extending outwardly from an inner surface of the retainer, the portion having a hole for receiving the fastener therethrough so as to fixedly secure the retainer to the vehicle body, and wherein the bumper is mounted onto the retainer so as to place the retainer between the bumper and the vehicle body, and wherein The outer surface of the retainer is configured to extend substantially coextensively between the pair of opposing longitudinal edges of the bumper so as to support the inner bumper surface of the bumper; and
   a clip fixedly secured to the flange for securing the retainer to the bumper.

2. A bumper cover assembly as set forth in claim 1, wherein the fastener includes a pair of flanges that are spaced apart to receive a portion of the retainer therebetween, so as to fixedly secure the bumper to the body of the vehicle.

3. A bumper cover assembly as set forth in claim 2, wherein the retainer includes a plurality of fingers disposed along the hole of the portion, wherein each of the plurality of fingers extend inwardly toward each other, and each of the plurality of fingers having arcuately shaped ends that define the hole for receiving the fastener therethrough.

4. A bumper cover assembly as set forth in claim 1, wherein the bumper is a rear bumper having a rear wall and a side wall, the rear wall extending along a back end of the vehicle, the side wall extending generally orthogonally relative to the rear wall.

5. A bumper cover assembly as set forth in claim 4, wherein the retainer is fixedly secured along the inner surface of the side wall.

6. A bumper cover assembly as set forth in claim 5 including a flange extending from the inner surface of the side wall.

7. A bumper cover assembly as set forth in claim 6 including a metal clip adapted to be fixedly secured to the flange for coupling the retainer to inner surface of the side wall.

8. A vehicle comprising:
   a body;
   a fastener extending outwardly from the body;
   a bumper having an inner bumper surface and an outer surface extending transversely between a pair of opposing longitudinal edges;
   a retainer having an inner surface opposite an outer surface, the outer surface having a shape complimentary to the inner bumper surface of the bumper, a plurality of integrally formed ribs, and a portion extending outwardly from the inner surface of the retainer, the portion including a hole for receiving the fastener therethrough so as to fixedly secure the retainer to the vehicle body, and wherein the bumper is mounted onto The retainer such that the outer surface of the retainer is configured to extend substantially coextensively between the pair of opposing longitudinal edges of the bumper so as to support the inner bumper surface of the bumper, and wherein each of the plurality of integrally formed ribs provides structural support to the retainer so as to further reinforce the bumper.

9. A vehicle as set forth in claim 8 wherein the bumper includes a flange extending outwardly from the inner bumper surface.

10. A vehicle as set forth in claim 9, including a clip fixedly secured to the flange for securing the retainer to the bumper.

11. A vehicle as set forth in claim 8, wherein the fastener includes a pair of flanges that are spaced apart to receive a portion of the retainer therebetween, thereby securing the bumper to the body of the vehicle.

12. A vehicle as set forth in claim 11, wherein the retainer includes a plurality of fingers disposed along the hole of the portion, wherein each of the plurality of fingers extend inwardly toward each other, and each of the plurality of fingers having arcuately shaped ends that are spaced apart to define a hole for receiving the fastener therethrough.

13. A vehicle as set forth in claim 8, wherein the bumper is a rear bumper having a rear wall and a side wall, the rear wall extending along a back end of the vehicle, the side wall extending generally orthogonally relative to the rear wall.

14. A vehicle as set forth in claim 13, wherein the retainer is fixedly secured along the inner surface of the side wall.

15. A vehicle as set forth in claim 14 including a flange extending from the inner surface of the side wall.

16. A vehicle as set forth in claim 15 including a clip fixedly secured to the flange for securing the retainer to the bumper.

17. A bumper cover assembly mounted to a vehicle body comprising:
   a bumper molded from a resin, the bumper having an outer surface and an inner bumper surface extending transversely between a pair of opposing longitudinal edges, and a flange extending outwardly from the inner bumper surface;

a fastener extending outwardly from the vehicle body;

a retainer having an outer surface, the outer surface having a shape complimentary to the inner bumper surface of the bumper, the retainer further including a portion extending outwardly from the inner surface of the retainer, the portion having a hole for receiving the fastener therethrough so as to fixedly secure the retainer to the vehicle body; and a clip fixedly secured to the flange for securing the retainer to the bumper and wherein the bumper is mounted onto the retainer so as to place the retainer between the bumper and the vehicle body, and wherein the outer surface of the retainer is configured to extend substantially coextensively between the pair of opposing longitudinal edges of the bumper so as to support the inner bumper surface of the bumper.

* * * * *

UNITED STATES PATENT AND TRADEMARK OFFICE
CERTIFICATE OF CORRECTION

| | | |
|---|---|---|
| PATENT NO. | : 7,625,021 B2 | Page 1 of 1 |
| APPLICATION NO. | : 11/463761 | |
| DATED | : December 1, 2009 | |
| INVENTOR(S) | : Umesh Naik et al. | |

It is certified that error appears in the above-identified patent and that said Letters Patent is hereby corrected as shown below:

Column 1, line 32 replace "alone" with --along--

Column 2, lines 26-27 delete "Fig. 1 clearly shows that the bumper has a pair of opposing longitudinal edges. No new matter was added."

Column 2, lines 64-68 delete "Support for the "outer surface extending between opposite distal ends of the main wall" may be found in the drawings. Specifically Fig. 1 shows the retainer having an outer surface that extends between opposite distal ends. No new matter was added."

Column 3, line 43 replace "The" with --the--

Column 3, line 53 replace "The" with --the--

Column 4, line 30 replace "The" with --the--

Signed and Sealed this
Twenty-eighth Day of December, 2010

David J. Kappos
*Director of the United States Patent and Trademark Office*